United States Patent
Farag et al.

(10) Patent No.: US 7,194,020 B1
(45) Date of Patent: Mar. 20, 2007

(54) METHOD AND APPARATUS FOR DYNAMICALLY ADJUSTING ACQUISITION SEARCH WINDOW

(75) Inventors: Emad N. Farag, Flanders, NJ (US); Michael Flanagan, Chester, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1251 days.

(21) Appl. No.: 09/591,560

(22) Filed: Jun. 9, 2000

(51) Int. Cl.
    *H04B 1/00* (2006.01)
(52) U.S. Cl. .................................... 375/148
(58) Field of Classification Search ............... 375/130, 375/138, 140, 141, 148–150, 343, 344, 316, 375/145, 147, 362–367, 340, 354; 342/357.15, 342/380, 357.06, 357.01, 352, 350, 379, 342/378; 370/210, 335, 342, 470, 503, 523, 370/509–515, 465, 464, 498, 329, 328, 310, 370/522; 455/440, 441, 463, 403, 422.1
    See application file for complete search history.

(56) References Cited

U.S. PATENT DOCUMENTS

| | | | | |
|---|---|---|---|---|
| 4,217,586 A | * | 8/1980 | McGuffin | ............... 342/380 |
| 5,392,287 A | * | 2/1995 | Tiedemann et al. | ......... 370/311 |
| 5,790,589 A | * | 8/1998 | Hutchison et al. | .......... 375/149 |
| 6,101,173 A | * | 8/2000 | Bayley | ....................... 370/311 |
| 6,188,351 B1 | * | 2/2001 | Bloebaum | ............. 342/357.15 |
| 6,377,614 B1 | * | 4/2002 | Yamashita | .................. 375/149 |
| 6,714,785 B1 | * | 3/2004 | Han | ........................... 455/440 |

FOREIGN PATENT DOCUMENTS

WO    WO 9810538    *    3/1998

* cited by examiner

*Primary Examiner*—Pankaj Kumar

(57) ABSTRACT

A method for detecting packet data transmission following an inactive period of a transmitter. The method includes using a dynamic acquisition search window which grows from an initial width (determined by the size of the corresponding standard search window prior to entering the inactive period) up to a maximum width (for example, the width of a full cell) in correspondence with the length of time that the transmitter is in the inactive state. The method is particularly directed to a mobile transmitter having active and inactive periods. The method according to the present invention is also useful relative to streaming data, such as voice, including a plurality of multipath components.

16 Claims, 6 Drawing Sheets

METHOD AND APPARATUS FOR DYNAMICALLY ADJUSTING ACQUISITION SEARCH WINDOW

FIELD OF THE INVENTION

The present invention relates to a method for detecting a multipath signal component at a receiver in a mobile wireless system, including a cellular telephone system.

BACKGROUND OF THE INVENTION

In general, transmitted data is received by a receiver along different paths (i.e., "multipath"), primarily due to signal reflections off buildings, hills, mountains, trees, etc., located between the transmitter and the receiver. This effect is magnified when one of the system terminals is a mobile terminal (such as in an automobile). FIG. 1 illustrates an example of multipath between a base station 100 and a mobile terminal 102, in which signals are transmitted, for example, directly (104), reflected off a mountain (106), and reflected off a building (108).

Because the different multipath components travel different distances before reaching the base station 100, they reach the base station 100 at different times.

Voice transmission, for example, is transmitted continuously across a narrow bandwidth wireless channel. On the other hand, packet data transmission occurs only sporadically (by definition, based on the intermittent transmission of data "packets"), but uses a large bandwidth when it does occur. A large number of packet data channels can share a wireless channel, because only one packet data channel having data to transmit will be actively sending data packets at any one time, whereas all other packet data channels will be quiet. Thus, the packet data channels in effect take turns sending packet data across the wireless channel.

In view of the foregoing, a particular problem occurs in packet data transmission between a mobile terminal and a base station. Specifically, the mobile terminal transmits packet data during an active period and is silent during an inactive period. The problem arises because the mobile terminal, by definition, moves relative to the base station, during both the active and inactive periods.

Finding new multipath components during the movement of the mobile terminal during an active period (i.e., while packet data is being transmitted) is processed in a conventional manner in what is known in the art as a "standard search." For example, it is conventionally known to use a "rake receiver" in base-band receiver systems, using code-division multiple access (CDMA). Each rake receiver has rake fingers, each of which independently tracks a respective received multipath component. Each rake finger adaptively cancels delay spread between multipath components, adjusts the phase between the multipath components, and equalizes the level of output of the received signal. The rake receiver can therefore receive simultaneous signals corresponding to each multipath component from the same CDMA carrier.

A CDMA base-band receiver also includes a searcher subsystem for finding new multipath components by scanning received data. The multipath components may be particularly indicated by pre-defined symbol patterns called pilot symbols, which are known to the receiver. Alternatively, the received energy at different delay offsets may be measured in the search window to locate the multipath components. The CDMA base-band receiver also includes a rake finger management system for setting up and tearing down rake fingers based on information provided by the searcher subsystem.

FIG. 2 is a flow chart illustrating a conventional approach to moving between active and inactive periods of data transmission at the receiver. Detection of multipath components during movement of the mobile terminal during an active period (i.e., while packet data is being transmitted) is processed in a conventional manner by the searcher and rake finger management subsystems of the base station. More specifically, once a valid multipath component is acquired and assigned to a rake finger in the rake receiver, standard searches are performed in a known manner, using a standard search window associated with the rake finger having the strongest power. Standard search requests (indicated by 200 in FIG. 2) are performed until the mobile terminal goes into the inactive state, at which time the receiver loses contact with the mobile terminal. Standard search requests are performed in accordance with known methods in a variety of ways.

If data transmission stops (i.e., if an inactive period starts), as determined at 202 in FIG. 2, an acquisition search request is processed, as indicated by 204. During the inactive period the mobile terminal cannot be tracked because there is no data being transmitted, including pilot symbols. Therefore, when a mobile terminal switches from inactive to active, an acquisition search 204 is needed to determine the location of the mobile terminal. Acquisition searches are performed continuously during the inactive period because receiver does not know when the transmitter will have data to transmit. The receiver must therefore be on the "lookout" for an incoming signal.

An example of an acquisition search process 204 used by a conventional searcher subsystem is schematically illustrated in FIG. 3. As shown, a sample of a detected input signal 302 is multiplied in a known manner with a sample of a reference signal 304 equal in length to the input signal sample, using a multiplier 306. Both the input signal 302 and the reference signal 304 are complex digital (e.g., $(1\pm j)$ and $-(1\pm j)$). Accordingly, the result of multiplying input signal 302 and reference signal 304 results in a plurality of values which are summed by adder 308 in a known manner, thereby resulting in a certain total value over the entire sample. That total value is stored, for example, in memory register 310.

Thereafter, the reference signal 304 is shifted by an arbitrary amount that is less than one chip (for example, one ½-chip) relative to the input signal 302 in a known manner by signal shift controller 312. The process of multiplying the input signal 302 and reference signal 304 (now shifted relative to each other) is then repeated. The summed value of that operation is also stored in memory register 310. The input signal 302 and reference signal 304 are then shifted incrementally again relative to each other.

The process of shifting the input and reference signals, multiplying the signals, and storing the result is repeated over the entire "width" of the conventional acquisition search window (which is, for example, a certain number of ½-chips). The conventional acquisition search window corresponds to a radius of the cell associated with the receiver (e.g., 10 km).

Once the search over the entire acquisition search window is complete, the highest value stored in memory register 310 is identified in a known manner by a maximum value detector 314. That highest value is compared to a predetermined threshold value in a known manner by a discriminator 316. Exceeding the threshold value corresponds with acquisition of a new viable multipath component, thus indicating the end of the inactive period and the start of a new active period (see step 206 in FIG. 2). Therefore, a new standard search request (200 in FIG. 2) is started, as discussed above.

Not exceeding the threshold value corresponds with a determination that data transmission has not restarted. The process then returns to perform another conventional acquisition search (204 in FIG. 2).

Generally, the conventional acquisition search window is substantially wider than the standard search window (to account for uncertainty in the location of the mobile terminal, which can be anywhere in the cell). However, a wide acquisition search window leads to a longer search time (because more cycles of signal shifting, multiplication, and value storage are required), which leads to a longer acquisition time for acquiring the channel in question. The width of the conventional acquisition search window is not adaptively associated with, for example, the length of the mobile terminal inactive period or the last known location of the mobile terminal.

Long search times are problematic because when the mobile terminal enters an active state from an inactive state, a preamble is sent across the channel to the base station, prior to packet data transmission. Once transmission of the preamble is complete, the channel must be acquired and the channel and the receiver must be ready to receive the packet data transmission. If the receiver fails to acquire the channel prior to packet data transmission, part of the packet data is lost. It is therefore important to have a relatively fast acquisition search algorithm that is completed before the preamble is over. In the conventional acquisition search, time is consumed by completing a full search over the entire conventional acquisition search window, which delays the receiver being able to ready itself to receive the packet data from the mobile terminal.

SUMMARY OF THE INVENTION

The present invention is directed to a method for acquiring a multipath component of packet data at a receiver following an inactive period of the transmitter (especially a mobile transmitter). Generally, the method according to the present invention uses a relatively narrow (relative to the conventional art) initial acquisition search window in order to reduce channel acquisition time. This permits the use of a shorter preamble, which has the effect of speeding packet data transmission.

More specifically, the method according to the present invention uses a shorter initial acquisition search window. The size of the acquisition search window according to the present invention is dynamically widened in proportion to the length of the inactive period. In one example of the present invention, the proportionality between the width of the acquisition search window and the length of the inactive period is related to an expected maximum speed of the mobile terminal.

Although the present invention is primarily directed to packet data transmission, it is also applicable to streaming data transmission of voice, video, multimedia, etc.

DETAILED DESCRIPTION OF THE PRESENT INVENTION

The location of the mobile terminal during an inactive period is uncertain because its location is not tracked during the inactive period. Moreover, that uncertainty grows with a longer inactive period because the terminal is mobile and presumably moving. Therefore, the present invention is directed to using an acquisition search window which takes into account the uncertainty (in terms of the length of the inactive period) as to the location of the mobile terminal.

As noted above, the conventional art deals with uncertainty in the location of the mobile terminal by searching over the full extent of the search window (e.g., corresponding to the radius of a cell). In contrast, the present invention first uses a narrower window. The size of the acquisition search window is then expanded as the length of the inactive period increases, up to the maximum width of the search window.

The rate at which the acquisition search window is widened according to the present invention is related to the expected maximum speed of the mobile terminal. To illustrate how the acquisition search window grows over time, the maximum speed of the mobile terminal is assumed (strictly by way of example) to be no greater than about 65 mph, or 30 m/s.

In a CDMA system, it is known to multiply the data stream by a pseudorandom pulse sequence that has a much higher rate than the data stream. The rate of this pseudorandom sequence is the "chip rate" $R_c$. For a chip rate of, for example, 4.096 Mchips/s, the time between two consecutive chips (i.e., the "chip period") is 244 nsec. It is conventional to use the chip period as a unit of time. For example, 976 nsec can be expressed as 4 chip periods or 8½-chip periods, or simply as 4 "chips" or 8 "½-chips."

In general, the time $T_{prop}$ in which a signal propagates from a base station to a mobile terminal and back is given by $$Tprop = \frac{2d}{c}$$

where d is the distance between the base station and the mobile terminal, and c is the speed of light.

But $T_{prop}$ can be expressed in terms of ½ chips as $$Tprop(1/2 - chips) = \frac{4d}{c}Rc$$

where $R_c$ is the chip rate.

Thus, for example, if d=10 km (i.e., the mobile terminal is at the edge of a 10 km radius cell), and $R_c$=4.096 MChips/s, $T_{prop}$=546 ½-chips.

It follows that the maximum rate of change of the round trip propagation delay between the receiver and mobile terminal is twice the maximum expected velocity, divided by the speed of light, or:

$$(2)(30 \text{ m/s})/(3\times10^8 \text{ m/s}) = 200 \text{ ns/s}.$$

In view of the foregoing, the maximum rate of change of the roundtrip propagation delay is $(200\times10^{-9} \text{ s/s})\times(4.096\times10^6 \text{ chip/s}) = 0.8192$ chip/s, or less than $\frac{5}{6}$ chip/s.

Figure 1:
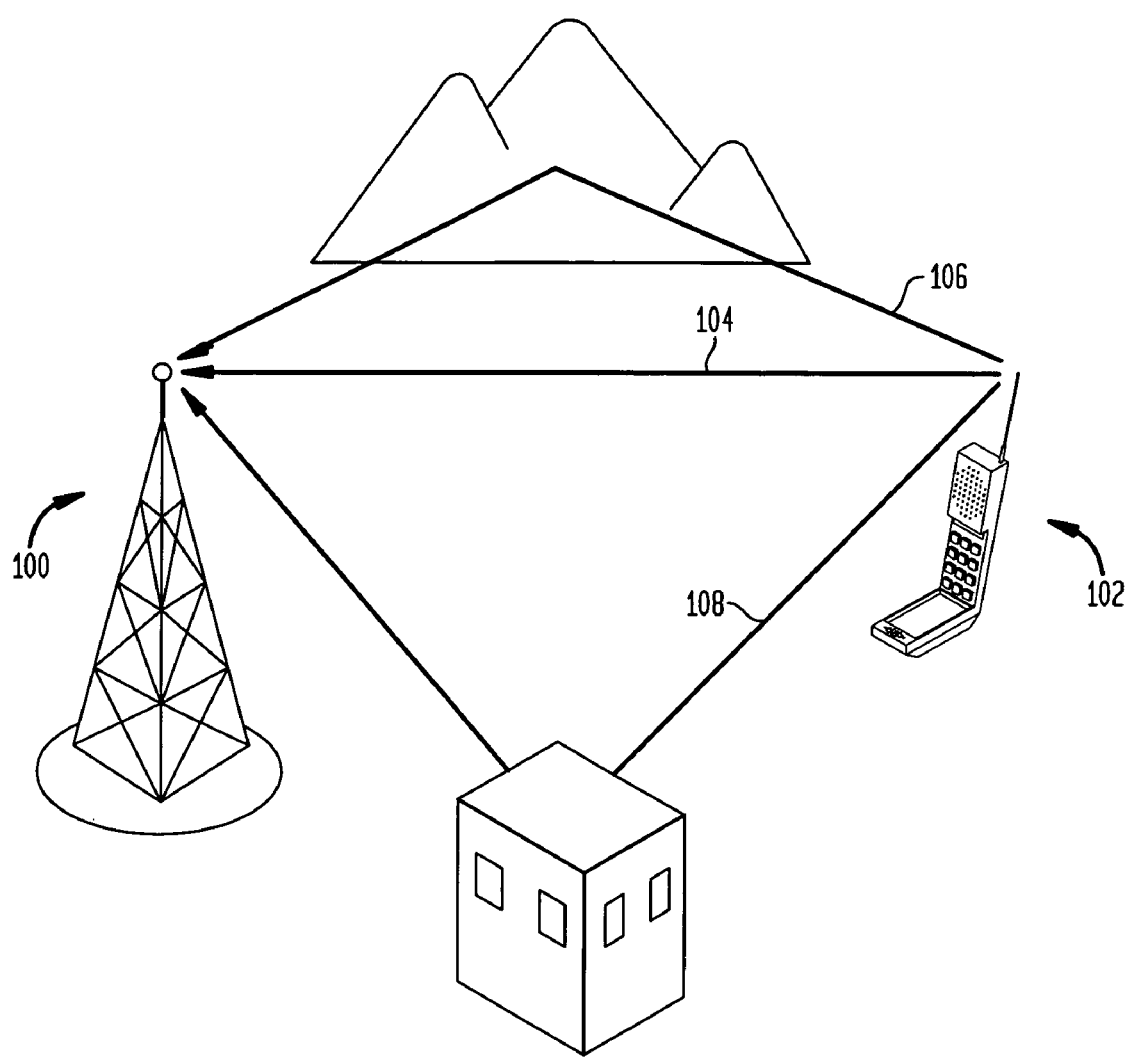
FIG. 1 illustrates the concept of multipath signal transmission between a transmitter and a receiver.
Figure 2:
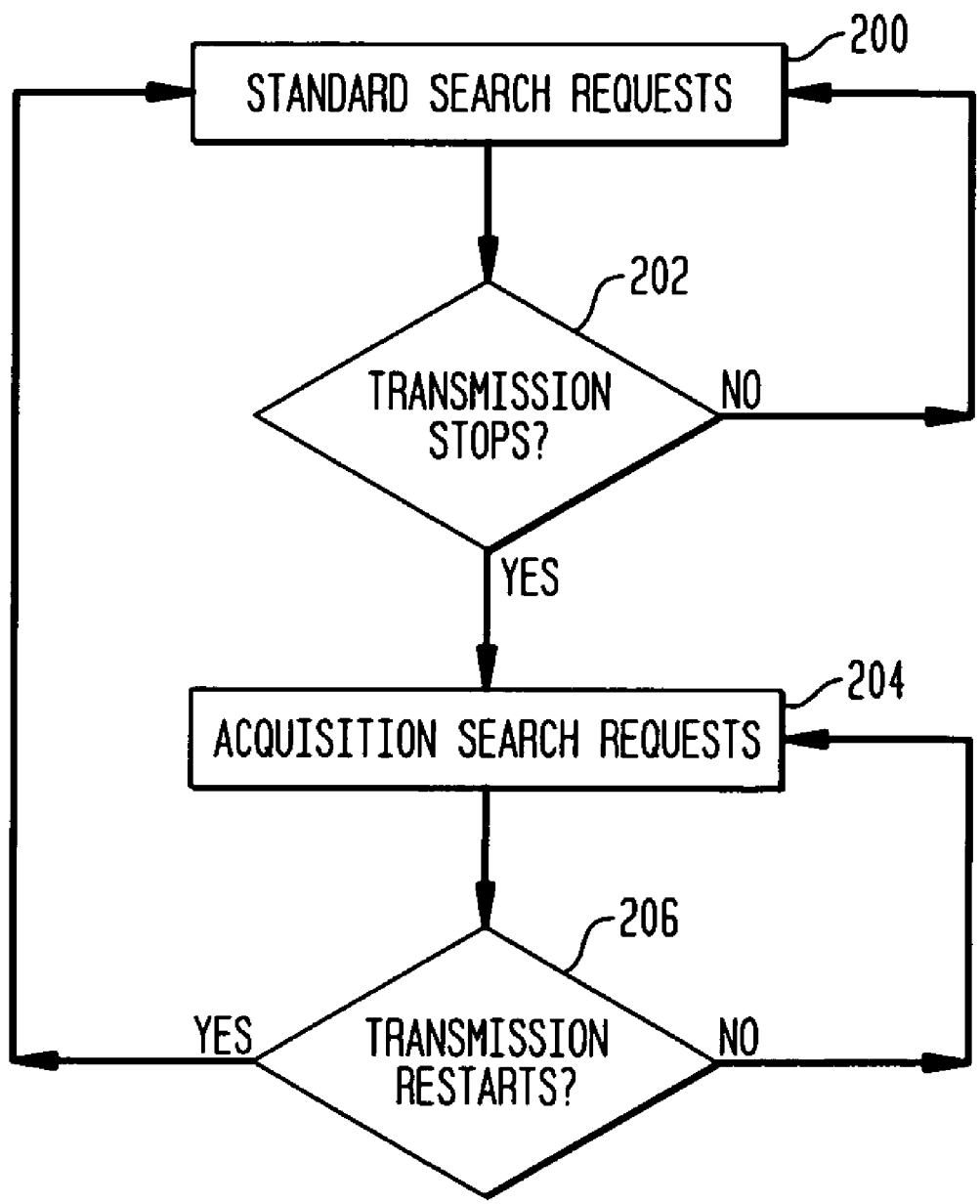
FIG. 2 illustrates a conventional manner in which a searcher of a receiver switches between active and inactive periods of data transmission from a transmitter.
Figure 3:
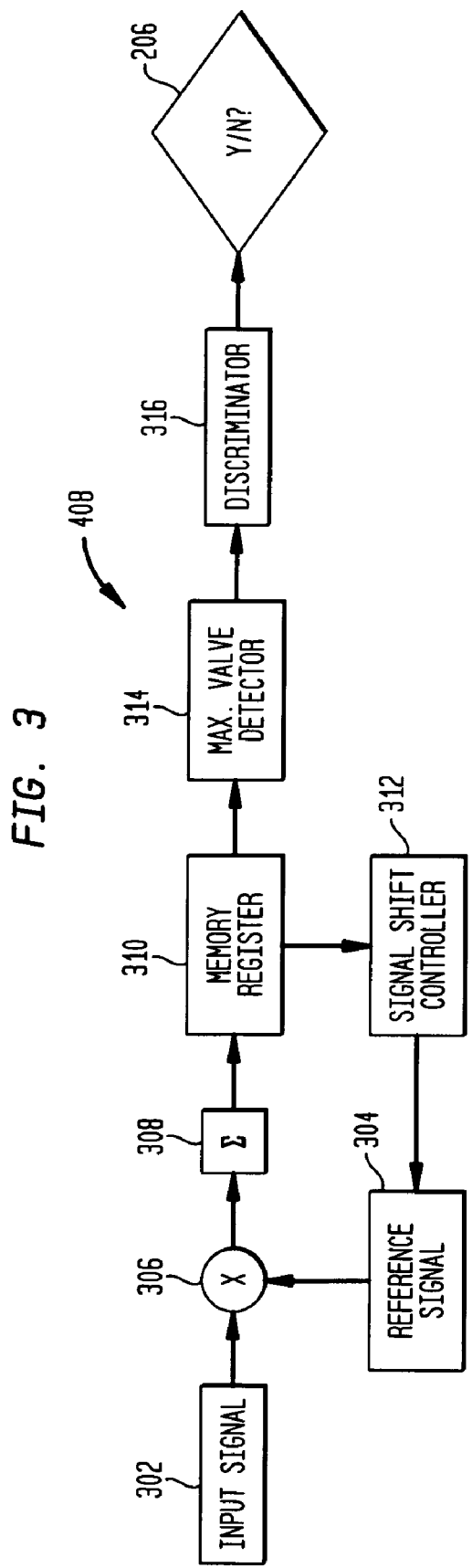
FIG. 3 illustrates a process by which an acquisition search is performed according to the conventional art.
Figure 4:
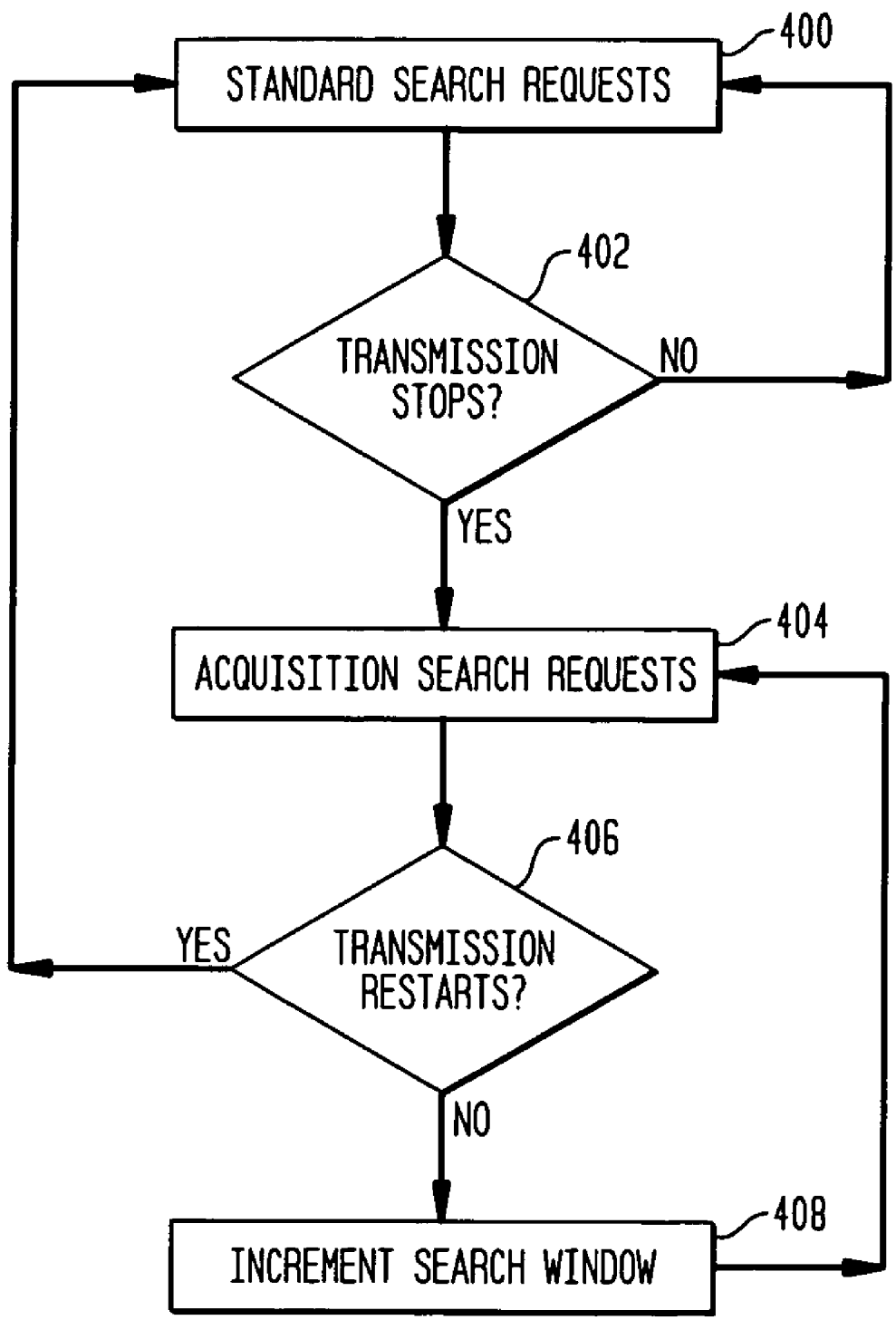
FIG. 4 illustrates a method by which a searcher of a receiver switches between active and inactive periods of data transmission from a transmitter in accordance with the present invention.
Figure 5:
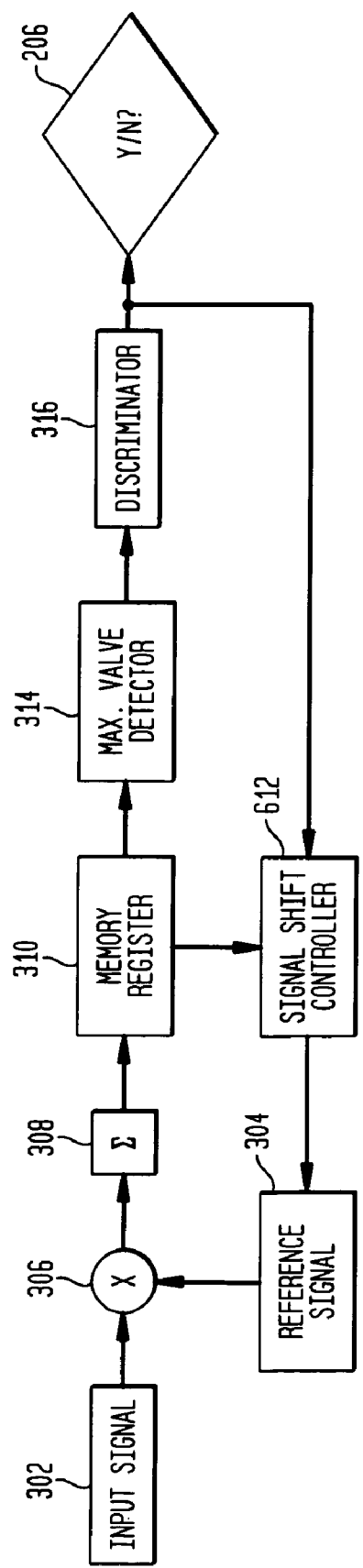
FIG. 5 illustrates a process by which an acquisition search is performed according to the present invention.

Thus, a flow chart illustrating the process of searching for multipath components of packet data at a receiver is set forth in FIG. 4. As discussed above, standard search requests 300 are conducted during the active period of data transmission. The process illustrated in FIG. 4 is generally similar to that shown in FIG. 2, so a detailed description thereof is not repeated here, except to note the process of incrementing the acquisition search window at 408. Thus, as discussed in more detail below, the acquisition search system illustrated in FIG. 3 is modified as shown in FIG. 5. Where the same elements in FIG. 3 are used in FIG. 5 the same reference numerals are used. However, the signal shift controller 612 according to the present invention operates differently than in the conventional search method, as discussed more fully below.

Figure 6:
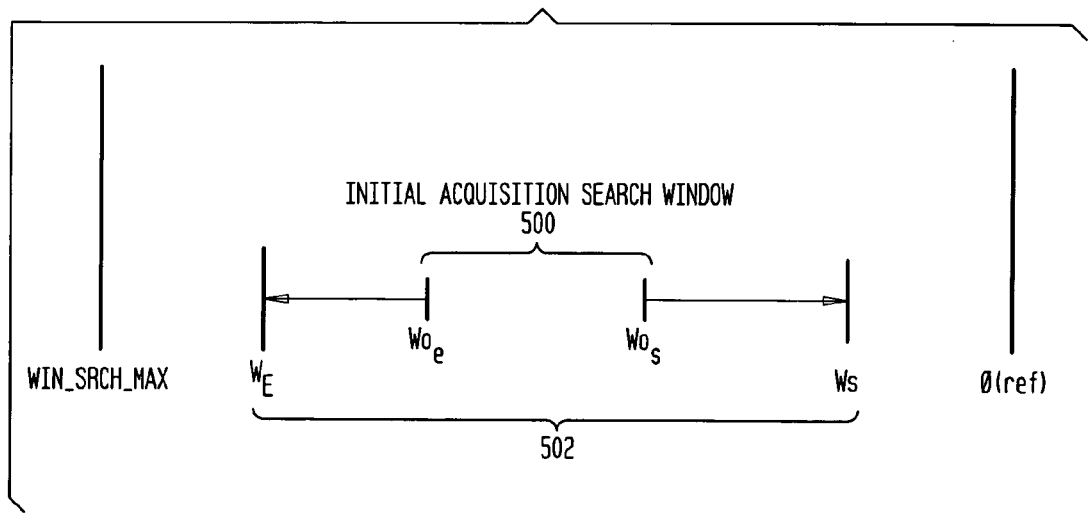
FIG. 6 is a schematic illustration of how the acquisition search window widens according to the present invention.

As illustrated in FIG. 6, the initial acquisition search window 500 starts at $W_{0s}$ and ends at $W_{0e}$. The width and location of initial acquisition search window 500 is based on the standard search window used just before the mobile terminal enters the inactive period. Conceptually, the initial acquisition search window 500 exists as a subset of the full search window, which is WIN_SRCH_MAX wide. The "distance" from the reference zero to $W_{0s}$ is a delay corresponding to a certain number of, for example, chip-wise or ½-chip-wise shifts as discussed above relative to the conventional art. In other words, the process illustrated in FIG. 3 and explained above, is delayed (i.e., the reference signal is shifted initially by $W_{0s}$), so that the process starts at a point corresponding to, for example, the $W_{0s}$th input signal/reference signal relative shift. Likewise, the process stops at, for example, the $W_{0e}$th input signal/reference signal shift. In net effect, this defines the smaller initial acquisition search window in accordance with the present invention. Thereafter, the process may start at an earlier shift point and end at a relatively later shift point.

Therefore, the signal shift controller 612 is additionally designed according to the present invention to delay the start of the search and conclude the search early (i.e., relative to WIN_SRCH_MAX). This pre-shifting can be accomplished by suitably controlling signal shift controller 612 to delay the start of the acquisition search and to cause an early stop thereto. In particular, the signal shift controller 612 is controlled in this manner so as to define an initial acquisition search window corresponding to the standard search window used just before entering the inactive period. For example, as illustrated in FIG. 5, the signal shift controller 612 may be constructed so as to use a determination by discriminator 316 that a viable multipath component was not detected in the instant search. According to the present invention, the search is either repeated using the same window or may be performed using an incrementally wider search window, the search window growing in proportion to the length of the inactive period. The signal shift controller 612 may therefore be controlled so as to redefine a new, incrementally wider search window by altering initial and ending shift points, as discussed above.

The dynamic start and end of the acquisition search window 502 (as the acquisition window grows in correspondence to the length of the inactive period) are therefore $W_S$ and $W_E$, respectively. Thus, the aforementioned delay becomes shorter while the early stop point is made later.

By way of illustrative example, and in accordance with the above-described example of a mobile terminal with a maximum expected speed of 30 m/s, $W_S = W_{0s} - (\frac{5}{6} \text{ chip/s})t$ when $W_{0s} - (\frac{5}{6} \text{ chip/s})t > 0$, and $W_S = 0$ when $W_{0s} - (\frac{5}{6} \text{ chip/s}) t <= 0$. Variable "t" is the time duration of the inactive period in seconds, as may be tracked by, for example, signal shift controller 612. The quantity ($\frac{5}{6}$ chip/sec) is the rate at which the search window grows (as discussed above), and may therefore be different in a different system used according to the present invention (depending on the chip rate in question as well as the maximum speed of the mobile terminal).

Conversely, $W_E = W_{0e} + (\frac{5}{6} \text{ chip/sec})t$ when $W_{0e} + (\frac{5}{6} \text{ chip/sec})t < \text{WIN\_SRCH\_MAX}$ and $W_E = \text{WIN\_SRCH\_MAX}$ when $W_{0e} + (\frac{5}{6} \text{ chip/sec})t => \text{WIN\_SRCH\_MAX}$, where WIN_SRCH_MAX is a constant corresponding to a maximum size of the acquisition search window. The maximum acquisition search window may, for example, be set to cover an entire cell, whereby WIN_SRCH_MAX is set to, for example, 546 ½-chips in the case of a cell having a 10 km radius.

In this example, therefore, the acquisition search window according to the present invention expands from between $W_{0s}$ and $W_{0e}$ (500) to between $W_S$ to $W_E$ (502), at a rate of 10 chips for every 12 seconds of inactivity.

The following table illustrates the speed advantage of the method according to the present invention as the length of the inactive period changes, and in comparison to a full search over a, for example, 546 ½-chip wide static acquisition search window as in the conventional art.

TABLE 1 speed advantage of the present invention

| Duration of Inactive State | Acquisition Search Window Only Grows To: | Search Speeded up by, compared to full search over a 546 ½-chip acquisition window |
|---|---|---|
| <6 seconds | 80 (½ chips) | 6.8 times |
| 30 seconds | 160 (½ chips) | 3.4 times |
| 66 seconds | 280 (½ chips) | 2.0 times |

As can be seen in Table 1, the speed advantage of the present invention over the conventional art is particularly noticeable when the inactive period is relative short (e.g., less than 6 seconds). However, significantly faster channel acquisition can still be had with inactive periods as long as 66 seconds. The method according to the present invention is significant as the cell radius increases.

Although packet data transmission is primarily discussed herein relative to the present invention, it is also applicable to streaming data transmission, including, but not limited to, voice, video, and multimedia. In particular, with respect to voice transmission, loss of synchronization conventionally results in call dropping. In accordance with the present invention, however, the dynamic acquisition search window is used to reacquire a multipath component of the streaming data, in the same way the dynamic acquisition search window is used to reacquire a multipath component of packet data following an inactive period of the transmitter.

While there have been shown and described and pointed out fundamental novel features on the invention as applied to preferred embodiments thereof, it will be understood that various omissions and substitutions and changes in the form and details of the devices illustrated, and in their operation, and in the method illustrated and described, may be made by those skilled in the art without departing from the spirit of the invention. For example, it is expressly intended that all combinations of those elements and/or methods steps which perform substantially the same function in substantially the same way to achieve the same results are within the scope of the invention. For example, the collective functionality of multiplier 306 and adder 308 may be provided by other known implementations within the knowledge of one of ordinary skill. Likewise, the operation of the signal shift controller for controlling search window width may be provided in another known manner within the knowledge of one of ordinary skill.

It is the invention, therefore, to be limited only as indicated by the scope of the claims appended hereto.

What is claimed is:

1. A method for detecting a multipath component of packet data at a receiver, comprising:
   identifying viable multipath components received by the receiver during an active period of data transmission, whereby the packet data is transmitted; and
   searching for a multipath component during an inactive period of said data transmission, including defining a dynamic acquisition search window having a time width which increases in proportion to a time duration of the inactive period, wherein
   the width and location of an initial dynamic acquisition search window starting at $W_{0s}$ and ending at $W_{0e}$ is based on a standard search window used before a mobile terminal enters the inactive period.

2. The method according to claim 1, wherein the dynamic acquisition search window has the initial start $W_{0s}$ and the initial end $W_{0e}$, a time t of the inactive period, and a start point as a function of time $W_S$ and an end point as a function of time $W_E$, wherein:

$W_S = W_{0s} - (5/6)t$ when $W_{0s} - (5/6)t > 0$ and $W_S = 0$ when $W_{0s} - (5/6)t <= 0$;

and $W_E = W_{0e} + (5/6)t$ when $W_{0e} + (5/6)t < \text{WIN\_SRCH\_MAX}$ and $W_E = \text{WIN\_SRCH\_MAX}$ when $W_{0e} + (5/6)t => \text{WIN\_SRCH\_MAX}$;

where WIN_SRCH_MAX is an arbitrarily selected upper limit for a maximum search window size.

3. The method according to claim 2, wherein WIN_SRCH_MAX is related to a radius of a cell associated with the receiver.

4. The method according to claim 1, wherein identifying viable multipath components during the active period of data transmission comprises searching for multipath components of packet data using the standard search window associated with a rake finger in a rake receiver having the greatest power amongst the rake finger in the rake receiver.

5. The method according to claim 1, wherein viable multipath components received by the receiver during the active period are identified until no multipath components are received by the receiver.

6. The method according to claim 1, wherein a transmitter transmitting the packet data is a mobile terminal that moves relative to the receiver during one or both of the active period and the inactive period.

7. The method according to claim 6, wherein the time width of the dynamic acquisition search window is increased in correspondence with an expected maximum speed of the mobile terminal.

8. The method according to claim 1, wherein the receiver is a mobile terminal that moves relative to a transmitter during one or both of the active period and the inactive period.

9. The method according to claim 8, wherein the time width of the dynamic acquisition search window is increased in correspondence with an expected maximum speed of the mobile terminal.

10. A method for acquiring a packet data multipath component at a receiver, comprising:
    associating a standard search window with a first packet data multipath component received at the receiver;
    upon loss of the first packet data multipath component, defining an acquisition search window having an initial width corresponding to the standard search window;
    searching for a second packet data multipath component across a width of the acquisition search window, wherein the width and location of an initial dynamic acquisition search window is based on the standard search window used before a mobile terminal enters an inactive period; and
    until the second packet data multipath component is detected, expanding the width of the acquisition search window in proportion to a period of time elapsed since loss of the first packet data multipath component and searching for the second packet data multipath component across the width of the expanded acquisitions search window.

11. The method according to claim 10, wherein searching for the second packet data multipath component comprises:
    comparing a detected signal with a reference signal;
    determining a value corresponding to the comparison of the detected signal and the reference signal;
    repeatedly shifting the detected signal incrementally relative to the reference signal, comparing the relatively shifted detected signal and the reference signal, and determining a value corresponding to the comparison of the relatively shifted detected signal and the reference signal, thereby obtaining a plurality of values corresponding to the comparisons between the detected and the reference signals and the relatively shifted detected and reference signals, the incremental shifting continuing up to an instantaneous width of the acquisition search window;
    identifying the highest value among the plurality of values corresponding to the comparisons between the detected and the reference signals and the relatively shifted detected and reference signals; and
    comparing the highest value to a threshold value, such that exceeding the threshold value corresponds with identification of the second packet data multipath component.

12. The method according to claim 1, wherein the dynamic acquisition search window has the initial start $W_{0s}$ and the initial end $W_{0e}$, a time t of the inactive period and k is a constant corresponding with a maximum rate of change of roundtrip propagation delay, and a start point as a function of time $W_S$ and an end point as a function of time $W_E$, wherein:

$W_S = W_{0s} - kt$ when $W_{0s} - kt > 0$ and $W_S=0$ when $W_{0s}-kt <=0$;

and $W_E=W_{0e}+kt$ when $W_{0e}+kt<\text{WIN\_SRCH\_MAX}$ and $W_E=\text{WIN\_SRCH\_MAX}$ when $W_{0e}+kt=>\text{WIN\_SRCH\_MAX}$;

where WIN_SRCH_MAX is an arbitrarily selected upper limit for a maximum search window size.

13. A method for detecting a multipath component at a receiver, comprising:
  upon loss of a multipath component, searching for a new multipath component over a dynamic acquisition search window having a time width which increases in proportion to a length of time during which no multipath component is detected, wherein the width and location of an initial dynamic acquisition search window starting at $W_{0s}$ and ending at $W_{0e}$ is based on a standard search window used before a mobile terminal enters an inactive period.

14. The method according to claim 13, wherein the dynamic acquisition search window has the initial start $W_{0s}$ and the initial end $W_{0e}$, a time t of the inactive period and k is a constant corresponding with a maximum rate of change of roundtrip propagation delay, and a start point as a function of time $W_S$ and an end point as a function of time $W_E$, wherein:

$W_S=W_{0s}kt$ when $W_{0s}-kt>0$ and $W_S=0$ when $W_{0s}-kt <=0$;

and $W_E=W_{0e}+kt$ when $W_{0e}+kt<\text{WIN\_SRCH\_MAX}$ and $W_E=\text{WIN\_SRCH\_MAX}$ when $W_{0e}+kt=>\text{WIN\_SRCH\_MAX}$;

where WIN_SRCH_MAX is an arbitrarily selected upper limit for a maximum search window size.

15. The method according to claim 13, wherein searching for the new multipath component comprises:
  comparing a detected signal with a reference signal;
  determining a value corresponding to the comparison of the detected signal and the reference signal;
  repeatedly shifting the detected signal incrementally relative to the reference signal, comparing the relatively shifted detected signal and the reference signal, and determining a value corresponding to the comparison of the relatively shifted detected signal and the reference signal, thereby obtaining a plurality of values corresponding to the comparisons between the detected and the reference signals and the relatively shifted detected and reference signals, the incremental shifting continuing up to an instantaneous width of the dynamic acquisition search window;
  identifying the highest value among the plurality of values corresponding to the comparisons between the detected and the reference signals and the relatively shifted detected and reference signals; and
  comparing the highest value to a threshold value, such that exceeding the threshold value corresponds with identification of the new multipath component.

16. The method according to claim 1, wherein the dynamic acquisition search window has an initial start point and an initial end point, and a dynamic start point that varies as a function of time and a dynamic end point that varies as a function of time.

* * * * *